(12) United States Patent
Lai et al.

(10) Patent No.: US 10,324,730 B2
(45) Date of Patent: Jun. 18, 2019

(54) MEMORY SHUFFLE ENGINE FOR EFFICIENT WORK EXECUTION IN A PARALLEL COMPUTING SYSTEM

(71) Applicant: MediaTek Inc., Hsinchu (TW)

(72) Inventors: Shou-Jen Lai, Zhubei (TW); Pei-Kuei Tsung, New Taipei (TW); Po-Chun Fan, Zhubei (TW); Sung-Fang Tsai, Hsinchu (TW)

(73) Assignee: MediaTek, Inc., Hsinchu (TW)

( * ) Notice: Subject to any disclaimer, the term of this patent is extended or adjusted under 35 U.S.C. 154(b) by 142 days.

(21) Appl. No.: 15/285,472

(22) Filed: Oct. 4, 2016

(65) Prior Publication Data

US 2017/0277567 A1 Sep. 28, 2017

Related U.S. Application Data

(60) Provisional application No. 62/312,567, filed on Mar. 24, 2016.

(51) Int. Cl.
*G06F 9/46* (2006.01)
*G06F 9/38* (2018.01)
*G06F 9/30* (2018.01)

(52) U.S. Cl.
CPC .......... *G06F 9/3887* (2013.01); *G06F 9/3012* (2013.01); *G06F 9/30036* (2013.01); *G06F 9/3824* (2013.01); *G06F 9/3851* (2013.01)

(58) Field of Classification Search
None
See application file for complete search history.

(56) References Cited

U.S. PATENT DOCUMENTS

| 4,272,828 A | * | 6/1981 | Negi | G06F 12/04 708/490 |
| 6,389,479 B1 | * | 5/2002 | Boucher | H04L 29/06 709/230 |

* cited by examiner

*Primary Examiner* — Wissam Rashid
(74) *Attorney, Agent, or Firm* — Tong J. Lee (57) ABSTRACT

A computing device performs parallel computations using a set of thread processing units and a memory shuffle engine. The memory shuffle engine includes a register array to store an array of data elements retrieved from a memory buffer, and an array of input selectors. According to a first control signal, each input selector transfers at least a first data element from a corresponding subset of the register array, which is coupled to the input selector via input lines, to one or more corresponding thread processing units. According to a second control signal, each input selector transfers at least a second data element from another subset of the register array, which is coupled to another input selector via other input lines, to the one or more corresponding thread processing units.

14 Claims, 10 Drawing Sheets

200
MEMORY SHUFFLE ENGINE FOR EFFICIENT WORK EXECUTION IN A PARALLEL COMPUTING SYSTEM

CROSS-REFERENCE TO RELATED APPLICATIONS

This application claims the benefit of U.S. Provisional Application No. 62/312,567 filed on Mar. 24, 2016.

TECHNICAL FIELD

Embodiments of the invention relate to a parallel computing device and a method performed by the parallel computing device.

BACKGROUND

Parallel computing has been widely implemented in modern computing systems. To support efficient parallel computing, a number of parallel programming models have been developed for programmers to write code that executes across heterogeneous platforms; for example, such a platform may include a combination of central processing units (CPUs), graphics processing units (GPUs), digital signal processors (DSPs), field-programmable gate arrays (FPGAs), hardware accelerators, etc. Commonly used parallel programming models include Open Computing Language (OpenCL™), variants and extensions of OpenCL, and the like.

Generally, a parallel programming model is built upon a parallel computing platform model. One parallel computing platform model, such as the one adopted by OpenCL, includes a host coupled to a set of computational resources. The computational resources further include a set of computing devices, and each computing device includes a set of compute units. Each compute unit further includes a set of processing elements. Typically, the host executes serial code and issues commands to the computing devices. The computing devices execute parallel code, also referred to as a kernel, in response to the commands. A kernel is a function declared in a program, and can be executed in multiple threads by multiple processing elements. An instance of a kernel can be executed as a work item by one or more processing elements. The same kernel can be executed as multiple work items of the same workgroup. Work items of the same workgroup share data in a local memory, and synchronize with each other via workgroup barriers.

The parallel programming model described above is a powerful tool for programmers to write efficient parallel code. However, conventional hardware platforms are not tailored to certain kernels that have a specific data access pattern, and are not flexible with respect to the assignment of workgroups. Thus, there is a need for improving the efficiency of parallel computing systems.

SUMMARY

In one embodiment, a computing device is provided to perform parallel computations. The computing device comprises: a set of thread processing units; and a memory shuffle engine coupled to the set of thread processing units. The memory shuffle engine includes: an array of registers operative to store an array of data elements retrieved from a memory buffer; and an array of input selectors. Each input selector is coupled to a corresponding subset of the registers via input lines and one or more corresponding thread processing units via one or more output lines. According to a first control signal, each input selector is operative to transfer at least a first data element from the corresponding subset of the array of registers to the one or more corresponding thread processing units. According to a second control signal, each input selector is operative to transfer at least a second data element from another subset of the registers, which are coupled to another input selector via other input lines, to the one or more corresponding thread processing units.

In another embodiment, a method a computing device is provided for performing parallel computations with thread processing units. The method comprises: receiving an instruction that identifies an array of data elements as input; and loading the array of data elements from a memory buffer into an array of registers in response to the instruction. The array of registers is coupled to an array of input selectors, and each input selector is coupled to a corresponding subset of the registers via input lines. The method further comprises: transferring, by each input selector, at least a first data element from the corresponding subset of the registers to one or more corresponding thread processing units according to a first control signal; and transferring, by each input selector, at least a second data element from another subset of the registers, which are coupled to another input selector via other input lines, to the one or more corresponding thread processing units according to a second control signal.

In yet another embodiment, a computing device is provided to perform parallel computations. The computing device comprises: a controller unit operative to assign workgroups to a set of batches that are coupled to the controller unit. Each batch includes: a program counter shared by M workgroups assigned to the batch, wherein M is a positive integer determined according to a configurable batch setting; a set of thread processing units operative to execute, in parallel, a subset of work items in each of the M workgroups; and a spilling memory to store intermediate data of the M workgroups when one or more workgroups in the M workgroups encounters a synchronization barrier.

In yet another embodiment, a method of a computing device is provided for performing parallel computations. The method comprises: assigning workgroups to a set of batches. At least one of the batches is assigned M workgroups sharing a program counter, M being a positive integer determined according to a configurable batch setting. The method further comprises: executing, by a set of thread processing units in parallel, a subset of work items in each of the M workgroups; and in response to a detection that one or more of the M workgroups encounter a synchronization barrier, storing intermediate data of the M workgroups in a spilling memory and loading a next subset of work items in the M workgroups into the thread processing units for parallel execution.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 illustrates an architecture of a parallel computing system according to one embodiment.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A computational problem that often arises in signal and image processing, as well as in various areas of science and engineering, involves the operation of a filter. For example, the filter may be a moving average filter, a weighted moving average filter, a finite impulse response (FIR) filter, etc. The filter may have K-taps with K being an integer greater than one, and the filter may be applied to every data point in a data series. A parallel computing device may divide the filter operation into multiple tasks or threads, where each compute unit handles the calculations of one thread. Thus, a compute unit is hereinafter referred to as a thread processing unit. One characteristic of the calculations is that most data points are used repeatedly in the calculations. In a conventional system, a parallel computing device that has N thread processing units performs per-lane memory access for accessing its source operands; for example, each thread processing unit may individually access its K source operands from a memory for performing a K-tap filter operation. This "per-lane" access causes the same data points to be repeatedly accessed from the memory. Repeated memory access for the same data is inefficient not only in terms of speed but also in terms of power consumption.

The inefficient data access problem can often be seen not only in data filtering, but also in object detection, image processing in general, matrix multiplication, as well as a wide range of other computations. In the following, data filtering is used as an example to simplify the description and illustration; however, it should be understood that the embodiments of the invention are applicable to a wide range of computations that involve repeated reuse of the same data elements by different thread processing units operating in parallel.

Embodiments of the invention provide a system and method for efficient work execution in a parallel computing system. The following description includes two parts. The first part describes a memory shuffle engine (MSE), which enables efficient data access for data elements that are repeatedly used by multiple thread processing units. The second part describes a mechanism for setting up a program counter batch that is shared by a configurable number of workgroups executed in parallel.

Figure 1:
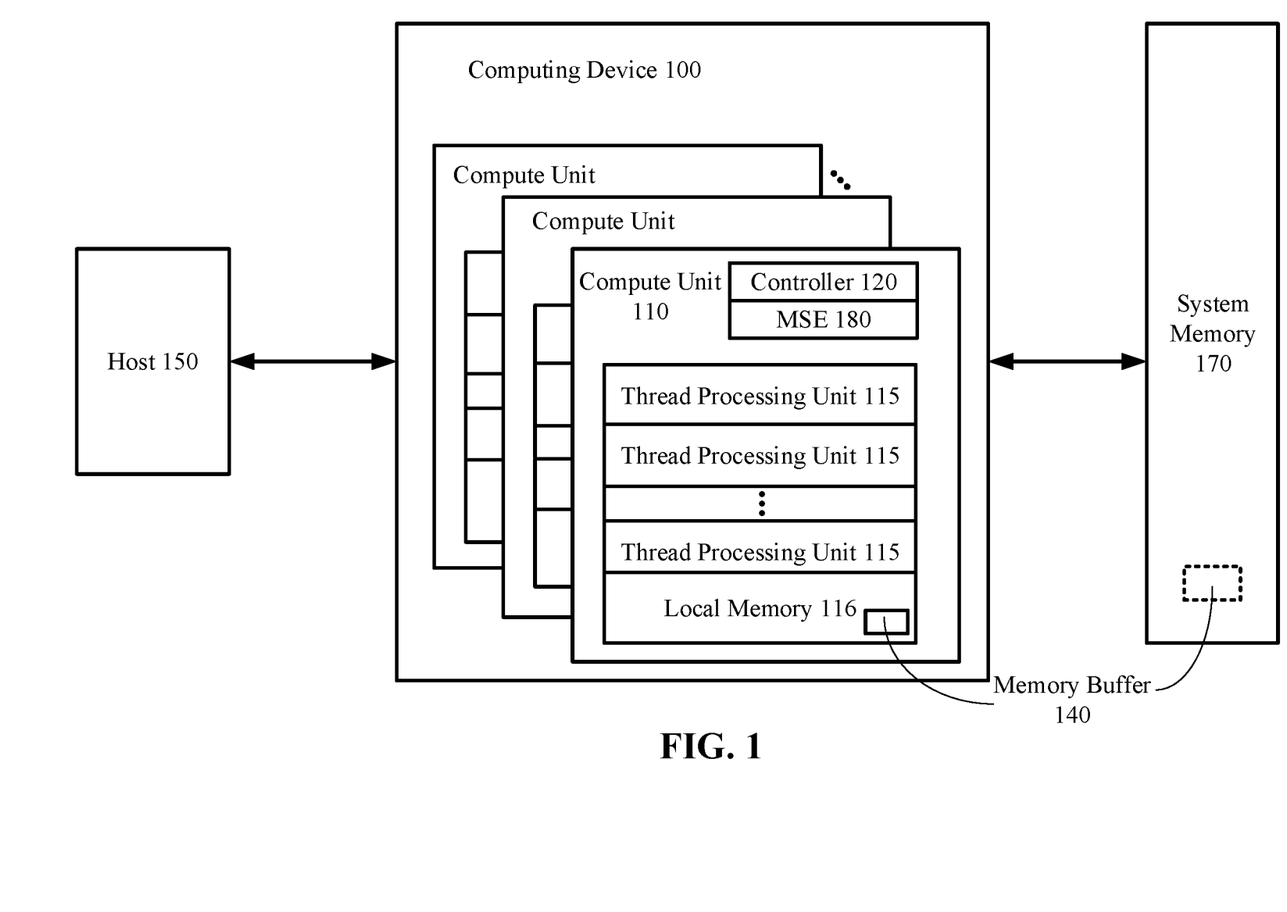

FIG. 1 illustrates a computing device 100 coupled to a host 150 and a system memory 170 according to one embodiment. The illustration of the computing device 100 has been simplified; it is understood that computing device 100 may include many more components that are omitted from FIG. 1 for ease of illustration. Examples of the computing device 100 include, but are not limited to, a graphics processing unit (GPU), a digital signal processor (DSP), an image processor, an application-specific instruction set processor (ASIP), etc. The DSP and ASIP perform signal, image and/or multimedia processing operations. Both DSP and ASIP may be programmable. An example of an ASIP is a specialized hardware accelerator that performs specialized functions supported by the system; e.g., encoding and decoding. The GPU performs graphics processing tasks; e.g., creating 2D raster representations of 3D scenes. The graphics processing may be referred to as 3D graphics pipelining or rendering pipelining. The 3D graphics pipelining may be implemented by a combination of fixed-function hardware tailored for speeding up the computation, and general-purpose programmable hardware to allow flexibility in graphics rendering. The general-purpose programmable hardware is also referred to as shader hardware. In addition to rendering graphics, the shader hardware can also perform general computing tasks.

The computing device 100 includes parallel execution hardware for performing single-instruction-multiple-data (SIMD) and/or single-instruction-multiple-thread (SIMT) operations. In one embodiment, the computing device 100 includes one or more compute units 110. Each compute unit 110 further includes a set of N thread processing units 115, such as Arithmetic Logic Units (ALUs), for performing parallel computations on the same instruction with multiple sets of data (e.g., N datasets) or threads. Each compute unit 110 also includes a local memory 116 for storing data that is shared among work items of the same workgroup. In one embodiment, the N thread processing units 115 may be assigned tasks from the same workgroup; alternatively, the N thread processing units 115 may be assigned tasks from more than one workgroup.

In one embodiment, the computing device 100 further includes a controller 120, also known as a memory shuffle controller. One responsibility of the controller 120 is to control the loading of data from a memory buffer 140 to the thread processing units 115. The memory buffer 140 may be located in the local memory 116; alternatively, the memory buffer 140 may be located in the system memory 170 as shown in FIG. 1 as a dashed block. The system memory 170 may be a dynamic random access memory (DRAM) or other volatile or non-volatile memory, and is typically off-chip; that is, on a different chip from the computing device 100. By contrast, the local memory 116 is on-chip; that is, it is on the same chip as the computing device 100. An example of the local memory 116 is static random access memory (SRAM). Other volatile or non-volatile memory may also be used as the local memory 116.

In one embodiment, the computing device 100 further includes a memory shuffle engine (MSE) 180. The MSE 180 supports a wide range of operations that involve the use of a data array for parallel computations. The MSE 180 serves as an intermediate between the memory buffer 140 and the thread processing units 115. In response to control signals from the controller 120, the MSE 180 may load a data array from the memory buffer 140, and send appropriate data elements of the data array to each thread processing unit 115. Further details about the MSE 180 will be provided below.

In one embodiment, the host 150 may include one or more central processing units (CPUs). The host 150 may issue commands to the computing device 100 to direct the computing device 100 to perform parallel computations. In some embodiments, the computing device 100 and the host 150 may be integrated into a system-on-a-chip (SoC) platform. In one embodiment, the SoC platform may be part of a mobile computing and/or communication device (e.g., a smartphone, a tablet, a laptop, a gaming device, etc.), a desktop computing system, a server computing system, or a cloud computing system.

Figure 2:
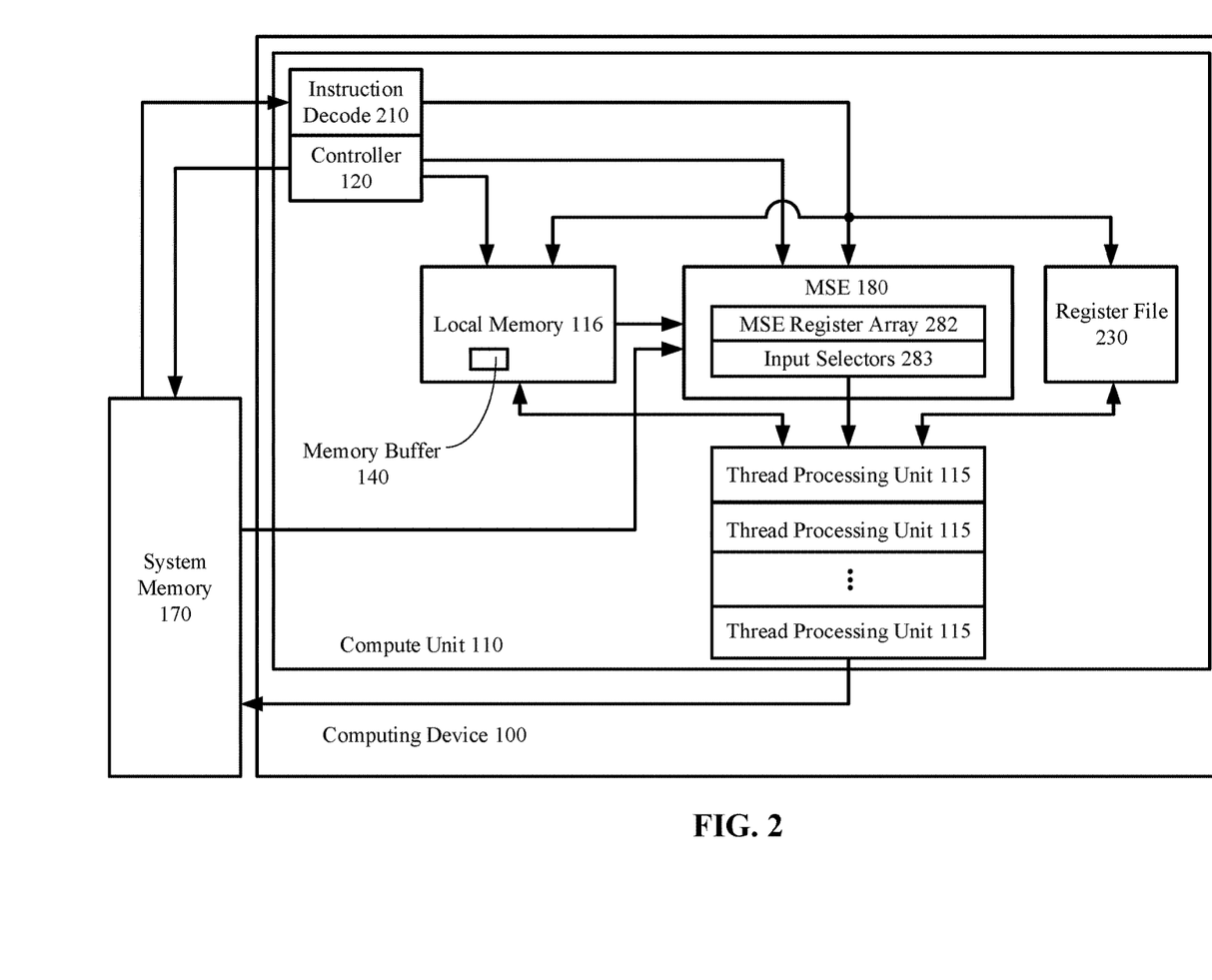
FIG. 2 illustrates a computing device in a parallel computing system according to one embodiment.

FIG. 2 illustrates further details of the computing device 100 according to one embodiment. In this embodiment, one compute unit 110 in the computing device is shown. It is understood that the computing device 100 may include any number of compute units 110. An instruction decode 210 decodes the instructions for execution by the thread processing units 115. The controller 120 loads the source operands of an instruction from the memory buffer 140, which may be off the chip (e.g., in the system memory 170) or on the chip (e.g., in the local memory 116 as shown in FIG. 2), into the thread processing units 115. Some instructions may have source operands in a register file 230. In one embodiment, in response to an instruction that incurs access of a data array (e.g., a filter operation instruction), the controller 120 loads the source operands in two steps: first, the source operands are loaded from the memory buffer 140 into the MSE 180, and then the source operands are loaded from the MSE 180 into the thread processing units 115. Memory access via the MSE 180 is more efficient than per-lane memory access, because the use of the MSE 180 removes repeated access to the same data elements in the memory buffer 140.

In one embodiment, the MSE 180 loads all of the data elements that will be used in a filter operation from the memory buffer 140 into the MSE 180 under the control of the controller 120. For example, the MSE 180 may be used for a 3-tap filter operation, which is formulated as: filter_output(i)=(d(i−1)+d(i)+d(i+1))/3, where i=1, . . . N, and N is the number of thread processing units 115 that are assigned to perform the filter operations in parallel. The MSE 180 loads all (N+2) data elements: d(0), d(1), . . . , d(N+1) into its internal flip-flops; i.e., MSE register array 282 (also referred to as "registers"). When the thread processing units 115 are ready to perform the filter operation, the MSE 180 outputs three consecutive data elements, in three time instants, as source operands to each thread processing unit 115.

In one embodiment, for K-tap filter operations, the MSE 180 may load all data elements that will be used in the filter operations into its internal register array 282. Although K can be any positive integer, in practice the value of K is limited by the number of registers 282 in the MSE 180 and the number of connections between the register array 282 and input selectors 283. Further details of the input selectors will be provided with reference to FIG. 3 and FIG. 4.

Figure 3:
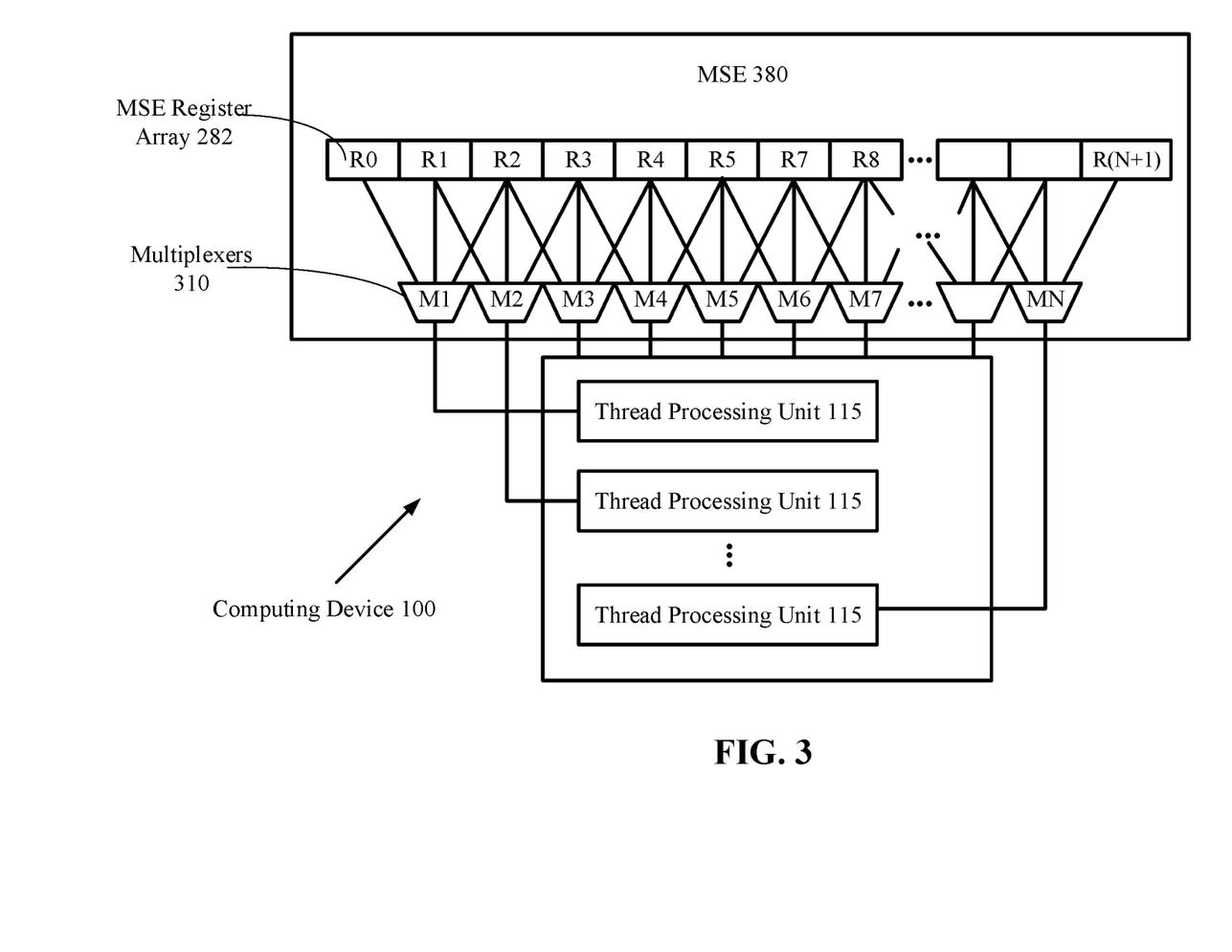
FIG. 3 illustrates an example of a memory shuffle engine according to one embodiment.

FIG. 3 illustrates an example of an MSE 380 according to one embodiment. The MSE 380 is an example of the MSE 180 of FIG. 1 and FIG. 2. The MSE 380 in this example supports the operations of a K-tap filter where K=3. It is understood that K=3 is used as a non-limiting example for simplifying the description and illustration. It is also understood that the MSE 380 may include additional circuitry that is not shown to simplify the illustration.

In this example, the MSE 380 includes (N+2) MSE registers 282 for storing (N+2) data elements, and a set of N multiplexers 310 for outputting the data elements to the corresponding N thread processing units 115. The multiplexers 310 is an example of the input selectors 283 of FIG. 2 for a 3-tap filter. Each multiplexer 310 has three input lines connecting to three of the registers 282 and one output line connecting to one thread processing unit 115. More specifically, each multiplexer 310 may transfer data elements from a corresponding subset of the register array 282 via its input lines to its corresponding thread processing unit 115 via its output line. For example, multiplexer M1 may transfer data from its corresponding subset of the register array 282 that includes R0, R1 and R2 to its corresponding thread processing unit 115, and multiplexer M2 may transfer data from its corresponding subset of the register array 282 that includes R1, R2 and R3 to its corresponding thread processing unit 115. Thus, two adjacent multiplexers 310 may reuse the same input data elements. For example, M1 and M2 may reuse the data elements that are stored in R1 and R2.

It is noted that the multiplexer 310 is an example of an input selector. A multiplexer 310 may receive data from its corresponding subset of the register array 282 via its input lines according to a first control signal (e.g., M1 receives a first data elements from R0), and may also receive data from another subset of the register array 282 that are coupled to another multiplexer 310 via other input lines according to a second control signal (e.g., M1 receives a second data elements from R1). Additional control signals may be generated to control further data transfers. In one embodiment, these control signals are generated by the controller 120. For example, the controller 120 may send first, second and third control signals at three time instants to select the first, second and third input lines of each multiplexer 310, respectively, to transfer three different data elements to that multiplexer's corresponding thread processing unit 115. In this way, all three input lines of each multiplexer 310 may be selected and the data elements in the three corresponding registers 282 can be sent to the corresponding thread processing unit 115.

When considering the set of the multiplexers 310 as a whole, the first control signal selects a first sequence of N consecutive data elements (e.g., d(0), d(1) . . . , d(N−1)) from the registers 282, and sends them to the N thread processing units 115 with each thread processing unit 115 receiving one of the data elements in the first sequence. Similarly, the second control signal selects a second sequence of N consecutive data elements (e.g., d(1), d(2) . . . , d(N)), and sends them to the N thread processing units 115 with each thread processing unit 115 receiving one of the data elements in the second sequence. The third control signal selects a third sequence of N consecutive data elements (e.g., d(2), d(3) . . . , d(N+1)), and sends them to the N thread processing units 115 with each thread processing unit 115 receiving one of the data elements in the third sequence. In this example, the first sequence and the second sequence are shifted by one data element, and similarly, the second sequence and the third sequence are shifted by one data element. That is, in this example, each of the sequences is a shifted version (by one data element) of its previous sequence. In alternative embodiments, each data sequence may be shifted by more than one data element from its immediate predecessor data sequence.

It can be seen from this example that the use of the MSE 380 significantly reduces the amount of memory access. In this example, the (N+2) data elements d(0), d(1) . . . , d(N+1) are loaded from memory (i.e., local memory 116 or system memory 170) into the MSE 380 once, and a subset of (N−1) data elements d(2), d(3), . . . , d(N) are used repeatedly by the thread processing units 115. If each thread processing unit 310 were to perform per-lane memory access for its source operands for the 3-tap filter operation, each of these data elements d(2), d(3), . . . , d(N) would be read from the memory three times. By contrast, the MSE 380 loads the entire data series of (N+2) data elements into its registers 282 once, without repeatedly reading the same data elements. The MSE 380 may then efficiently sends the appropriate source operands from its registers 282 to the thread processing units via its multiplexers 310.

In the example of FIG. 3, the MSE 380 includes two more registers 282 than the number of multiplexers 310 for holding two additional data elements at the boundaries (i.e., the beginning and the end) of the data array. In alternative embodiments, the number of registers 282 may be the same as, or more than the number of multiplexers 310 by a predetermined number different from two. These extra number of registers 282, if any, affects the number of taps that can be used in a filter operation, the number of data elements that can be shifted from one multiplexer 310 to the next, and other operations that may be performed by the thread processing units 115.

Figure 4:
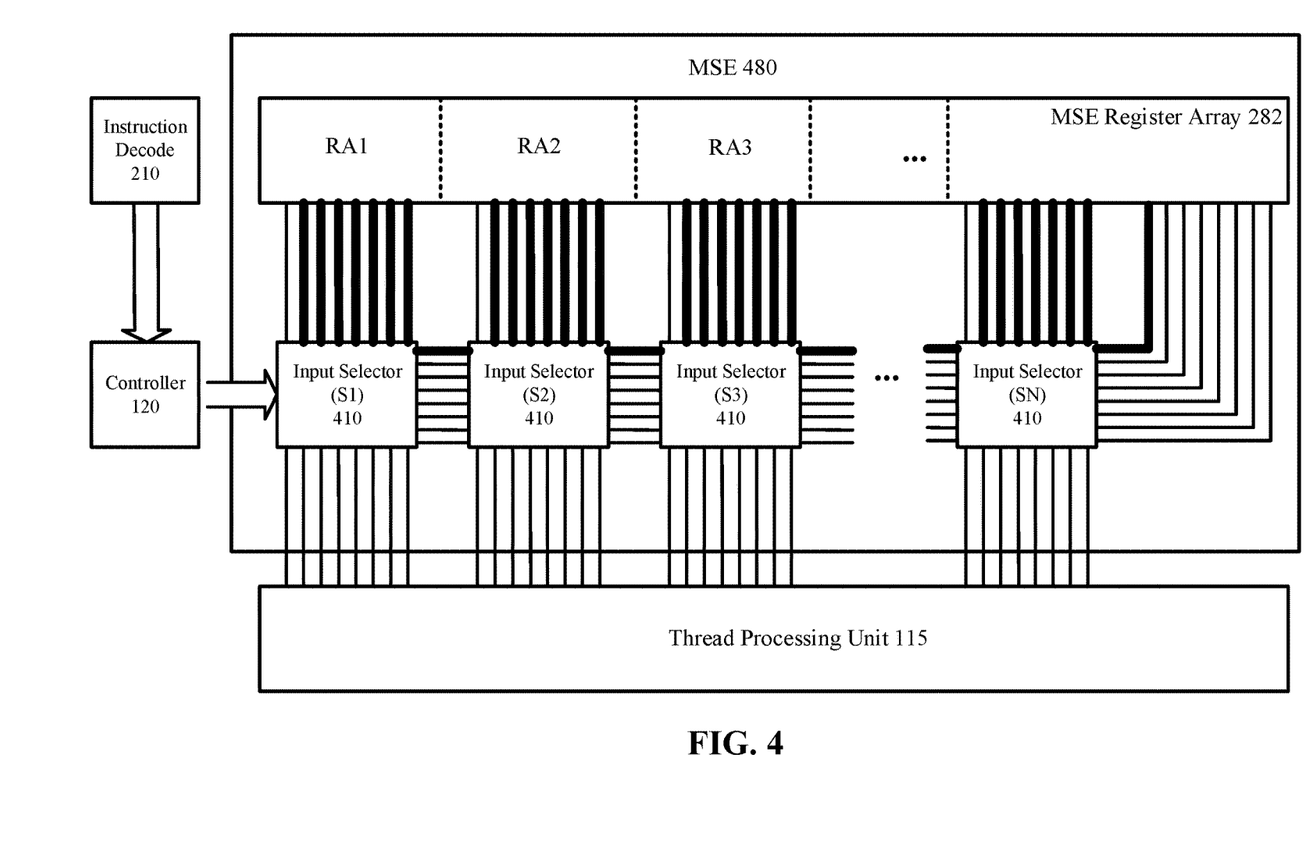
FIG. 4 illustrates an example of a memory shuffle engine according to another embodiment.

FIG. 4 illustrates another example of an MSE 480 according to one embodiment. The MSE 480 includes the array of MSE registers 282 coupled to an array of input selectors 410. In one embodiment, each input selector 410 includes at least one multiplexer, such as the multiplexer 310 of FIG. 3. In an alternative embodiment, each input selector 410 includes multiple multiplexers, switches, or routing elements to select inputs from a corresponding subset of the registers 282, and to transfer the inputs to corresponding thread processing units 115.

In the embodiment of FIG. 4, the instruction decode 210 decodes an instruction and pass on information about the decoded instruction to the controller 120. According to the information, the controller 120 generates one or more control signals to the input selectors 410 to control their operations on the data array, including but not limited to: shift, shuffle, select and pass-through. To simplify the illustration, FIG. 4 shows only the leftmost input selector 410 as the recipient of the control signals; it should be understood that all of the input selectors 410 receive the control signals, either directly or indirectly from the controller 120.

In one embodiment, each input selector 410 is coupled to a corresponding subset of the register array 282 via input lines for receiving input (e.g., input selector S1 is coupled to RA1, input selector S2 is coupled to RA2, etc.). In FIG. 4, the dotted lines that partition the register array 282 indicate the boundaries of some of the subsets. Moreover, each input selector 410 is also coupled to one or both of its adjacent input selectors 410. The connections (referred to as the "inter-selector connections") between two adjacent input selectors 410 may be unidirectional or bi-directional. Thus, each input selector 410 may receive data inputs not only from its corresponding subset via input lines, but also from other subsets of the register array 282 via the inter-selector connections. For example, input selector S1 may receive inputs from RA1 as well as RA2, RA3, . . . , etc.

In one embodiment, each input selector 410, in response to a propagation control signal, may pass a data element from a first adjacent input selector 410 to a second adjacent input selector 410 (e.g., data may be passed from S3 to S1 via S2, or from S4 to S1 via S2 and S3). The propagation control signal may be generated by the controller 120 or a designated one of the input selector 410.

Each input selector 410 is also coupled to a subset of thread processing units 115 via output lines. In FIG. 4, each output line may be used by an input selector 410 to transfer input data to a corresponding thread processing unit 115. The input data may be received from a selected input line or from a selected inter-selector connection. According to the control signals from the controller 120, an input selector 410 may select a data element from a register via an input line or an inter-selector connection, and transfer that data element to some or all of the thread processing units 115 that are connected to its output. Alternatively, an input selector 410 may select different data elements from different registers 282 via a combination of input lines and/or inter-selector connections, and transfer the different data elements to different thread processing units 115 that are connected its output. Although a specific number of input/output lines and inter-selector connections are shown, it is understood that each input selector 410 may be connected to any numbers of input/output lines and inter-selector connections in various embodiments.

In one embodiment, the controller 120 may generate one or more control signals to the input selectors 410 to control their operations on the data array, including but not limited to: shift, shuffle, select and pass-through. In some embodiments, the controller 120 may control the direction and amount of the shift, within the limit imposed by the number of registers 282, the number of input lines and the number of inter-selector connections, such that the output data array is a shifted version of the input data array. The controller 120 may also control the shuffle pattern applied on the input data array, and which input lines and/or inter-selector connections to select to enable data transfer to the output. The controller 120 may further command the input data array to pass-through the input selectors 410 such that the output data array is the same as the input data array.

In FIG. 4, some of the input lines and inter-selector connections are illustrated in thick lines to indicate that these lines/connections are selected or enabled. These thick lines show an example of left-shifting an input data array by one data element to produce an output data array. Assuming that the input data array is (d(0), d(1), d(2), d(3), . . . ) and each input line transfers one data element of the input data array to the input selectors 410. As a result of data shifting, the output data array generated by the input selectors 410 is (d(1), d(2), d(3), d(4) . . . ). As described in the example of FIG. 3, a K-tap filter operation may be implemented by a combination of shift operations and pass-through operations. In the example of data shifting, the propagation control is not enabled.

Figure 5A:
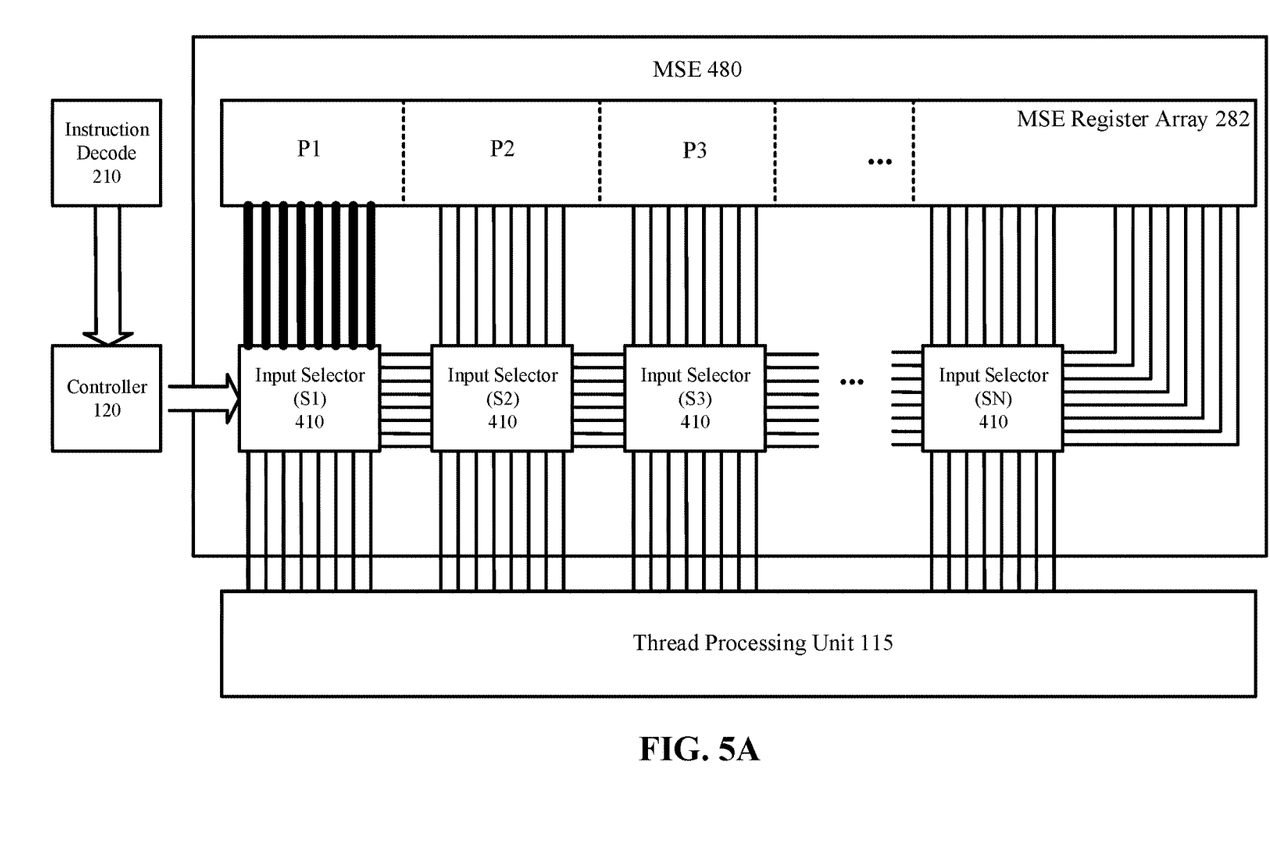
FIG. 5A and FIG. 5B illustrate examples of data transfer patterns of a memory shuffle engine according to one embodiment.
Figure 5B:
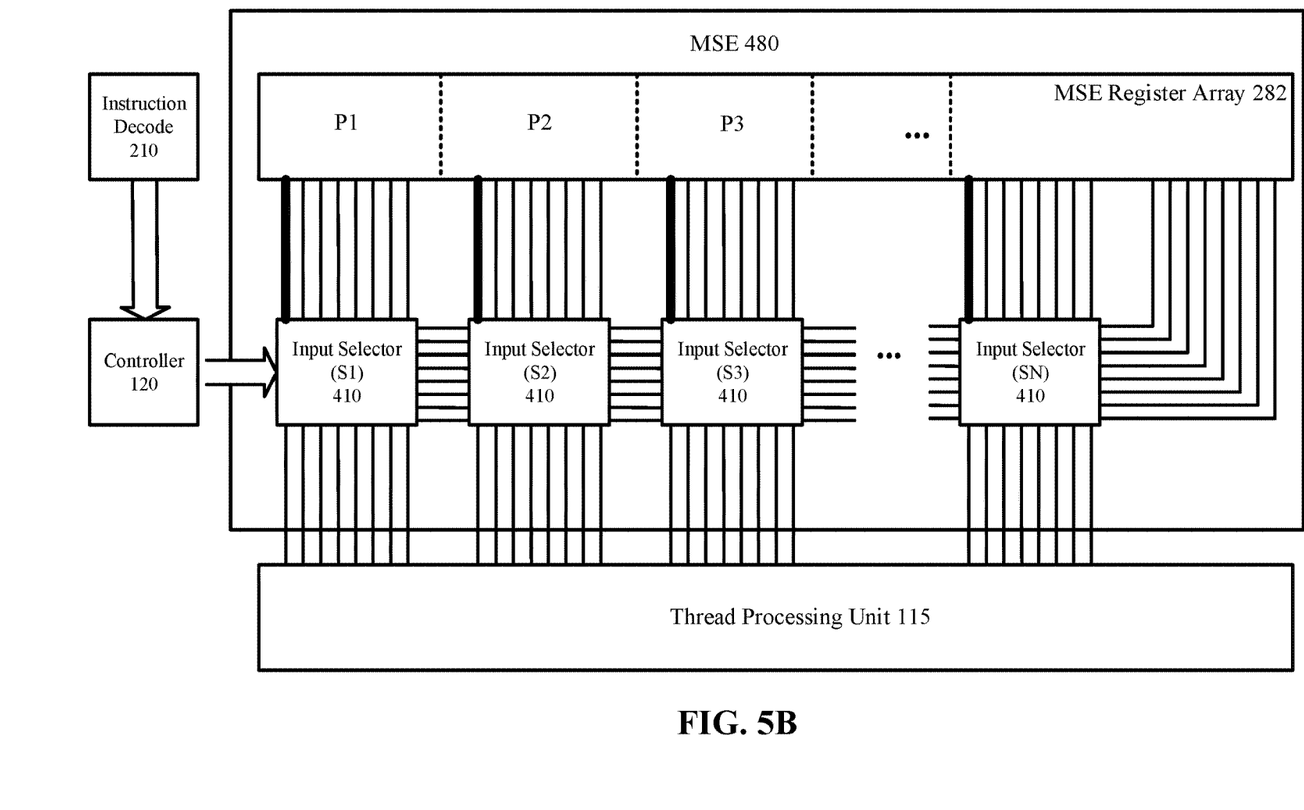

FIG. 5A and FIG. 5B illustrate examples of data transfer patterns of the MSE 480 according to one embodiment, in connection with matrix multiplications. FIG. 5A illustrates the dissemination of multiplicands from the selected input lines (shown as the thick input lines connecting to S1) to the output lines of all of the input selectors 410. For example, if the multiplicands are (d(0), d(1), . . . , d(7)), the input selector S1 may receive these multiplicands via its selected input lines, and the same multiplicands may pass-through S1 to reach its output lines and propagate to the other input selectors 410 to reach their respective output lines. At a different stage of the multiplication, a different group of input lines may be selected. FIG. 5B illustrates the dissemination of multipliers: each multiplier is transferred from one selected input line of an input selector 410 (shown a thick input line) to all output lines of that input selector 410. At a different stage of the multiplication, a different input line of each input selector 410 may be selected.

In addition to the aforementioned filter operations and matrix multiplications, the MSE (e.g., the MSE 180 of FIGS. 1 and 2, the MSE 380 of FIG. 3, and the MSE 480 of FIG. 4) may have other signal, image, multimedia processing applications including, but not limited to, object detection in computer vision and pattern recognition. One known technique for object detection applies a sliding window to an image to detect the presence of a given object (e.g., human). The sliding window may have a fixed size and may slide in any direction of the image, such as horizontal, vertical, or diagonal directions. Each instance of the sliding window (i.e., the sliding window at a particular location of the image) may be assigned to a thread processing unit 115 to process, and different instances of the sliding window may be assigned to different thread processing units 115 in parallel. In one embodiment, when the sliding window slides in a direction to create a sequence of sliding window instances, the consecutive sliding window instances have a large number of overlapping data elements. Thus, the data elements (source operands) provided to a first thread processing unit may be reused by a second thread processing unit. The MSE may be used to provide the data elements, including the overlapping data elements, to the thread processing units 115 without the repeated same-data access that would be caused by the per-lane access of the thread processing units 115.

For example, the histogram of oriented gradients (HOG) is a feature descriptor used in computer vision and image processing for the purpose of object detection. The technique counts occurrences of gradient orientation in localized portions of an image. The image is divided into small connected regions called cells. For the pixels within each cell, a histogram of gradient directions is compiled. The descriptor is the concatenation of these histograms. The first step of HOG computations is the computation of the gradient values. One common method for calculating the gradient values is to apply a discrete derivative mask in one or both of the horizontal and vertical directions. This mask is a filter mask, which is applied to an image cell to filter the color or intensity data of the image. Thus, similar to the filter operations described above with respect to a K-tap filter, the MSE may also be used in the calculation of the gradient values for HOG computations.

As mentioned before, the computing device 100 performs operations in response to instructions that are defined in the instruction set architecture (ISA) of the host 150 or the computing device 100. In one embodiment, a filter instruction specifies a first operand indicating a base address of a data array, a second operand indicating a size of the data array, and a third operand indicating an access order (e.g., linear, block, 3D, etc.). The following pseudo-code provides an example of a filter operation instruction with a 3-tap filter:

```
//define the mse buffer size
_local float mse[workgroup_size + 2];
*mse = (image[f(workgroup_ID)], workgroup _size + 2, linear);
//define the following:
//1. starting address in memory by workgroup_ID since access
is workgroup based
//2. access size
//3. access order (linear/block/3D/...)
//compute result using mse
float result = (mse[woki_id] + mse[woki_id+1] + mse[woki_id+2])/3;
```

In one embodiment, the ISA further defines instructions for other operations that may utilize the aforementioned MSE for object detection, matrix multiplications, etc.

Figure 6:
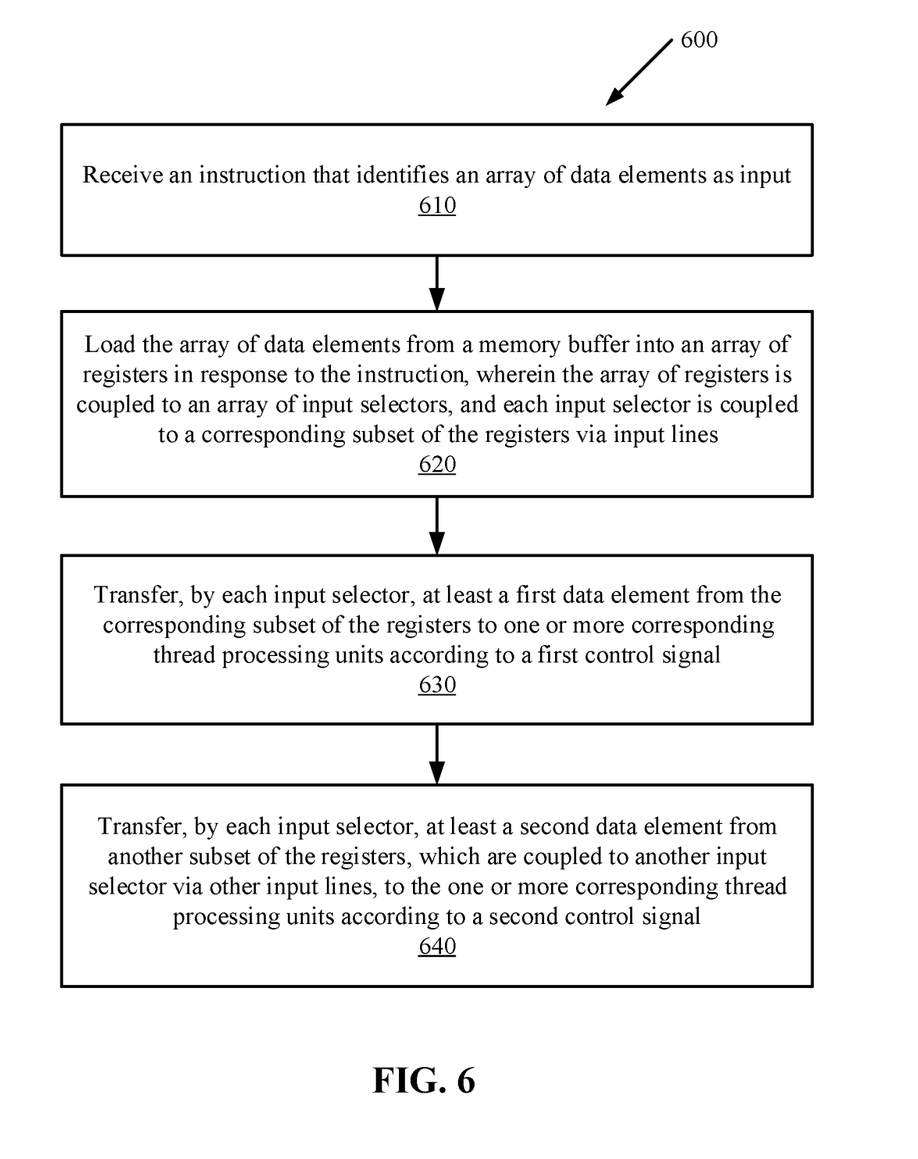
FIG. 6 is a flowchart illustrating a method performed by a computing device for parallel computations according to one embodiment.

FIG. 6 is a flowchart illustrating a method 600 performed by the computing device 100 according to one embodiment. In one embodiment, the method 600 may be performed by a parallel computing system or device, such as the computing device 100 of FIG. 1. Examples of input selectors have been provided in FIG. 3 and FIG. 4; other types of input selectors may also be used.

The method 600 begins with the computing device 100 receiving an instruction that identifies an array of data elements as input (step 610). The computing device 100 loads the array of data elements from a memory buffer into an array of registers in response to the instruction (step 620). The array of registers is coupled to an array of input selectors, and each input selector is coupled to a corresponding subset of the registers via input lines.

According to a first control signal, each input selector transfers at least a first data element from the corresponding subset of the registers to one or more corresponding thread processing units (step 630). According to a second control signal, each input selector transfers at least a second data element from another subset of the registers, which are coupled to another input selector via other input lines, to the one or more corresponding thread processing units (step 640). As explained above, the ability to select input not only from an input selector's corresponding subset of registers, but also from another input selector's corresponding subset of registers, promotes data reuse and reduces unnecessary memory traffic for repeatedly loading the same data from memory.

In the description above, it is assumed that N thread processing units are assigned to perform the filter operations in parallel. In OpenCL, the computation task assigned to each thread processing unit is referred to as a work item, and related work items that share data and synchronization barriers form a workgroup. Conventionally, work items of the same workgroup use the same program counter (PC) and form a single batch; thus, these work items would step through the instructions of a program in lockstep. In some scenarios, a workgroup may contain fewer work items than the number of thread processing units in a compute unit. Alternatively, a workgroup may contain more work items than the number of thread processing units in a compute unit, and the number of those work items is not evenly divisible by the number of thread processing units. Under any of these scenarios in a conventional system, the thread processing units that cannot be matched up with a work item would be left unused. It would be wasteful of system resources when some of the thread processing units are unused in parallel computations.

According to one embodiment of the invention, the thread processing units in a compute unit are partitioned into a number of batches. The number (M) of workgroups assigned to a batch is configurable. Assume that the number of thread processing units in a compute unit is N, and the number of thread processing units in a batch is P. The range of values for M is $1 \leq M \leq P$. For each workgroup in the M workgroups, the number of work items in the workgroup that can be executed in parallel is (P/M), which is smaller than the size of the workgroup (i.e., the total number of work items in the workgroup). Thus, it takes multiple numbers of iterations to process all of the work items in the workgroup.

Figure 7:
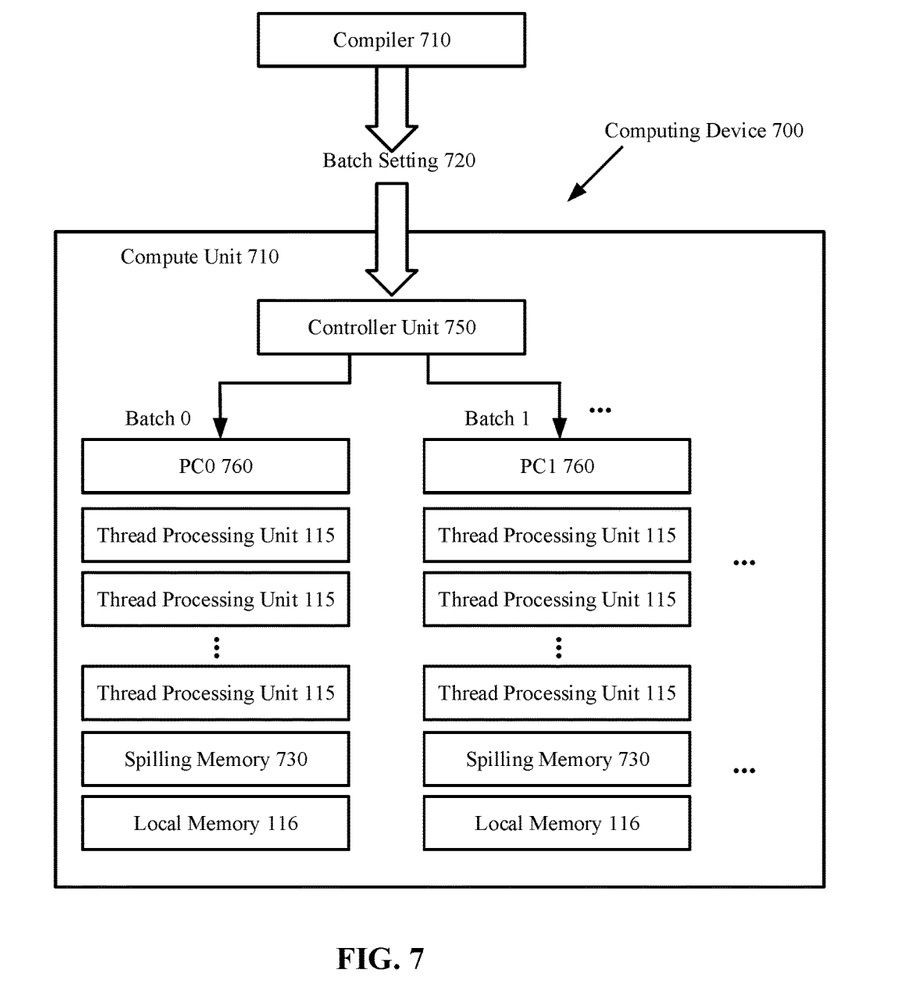
FIG. 7 illustrates a compute unit with a configurable number of workgroup assignment according to one embodiment.

FIG. 7 illustrates a compute unit 710 with a configurable number of workgroup assignment according to one embodiment. The compute unit 710, being part of a computing device 700, is one example of the compute unit 110 of FIG. 1. According to FIG. 7, the compute unit 710 includes additional and/or alternative elements that are not shown in the embodiment of FIG. 1. In this embodiment, the compute unit 710 supports a number of PC batches and a configurable number of workgroups in each batch. The compute unit 710 includes a controller unit 750, which in one embodiment may perform operations of the controller 120 of 1. Additionally or alternatively, the controller unit 750 may assign M workgroups to a batch according to a batch setting 720 determined by a compiler 710. In the following description, the same configurable value M is used across different batches. In an alternative embodiment, different batches may be assigned with different numbers of workgroups.

In one embodiment, the configurable number M may be determined at the compile time as shown in FIG. 7, or at the time of task scheduling. For example, the compiler 710 may analyze the input NDRange indicating the dimensions of the tasks to be performed, and determine which workgroups may be packed into the same batch. One criterion that may be used is that workgroups having the same synchronization barrier may be packed into the same batch. If M workgroups are packed into a batch, these workgroups may execute instructions according to the same program counter 760.

For simplicity of illustration, FIG. 7 shows only one compute unit 710 and two batches in the compute unit 710. It is understood that more than one compute unit 710 and more than two batches may be used to process all of the workgroups in an input. Each batch includes a program counter 760 shared by all workgroups in the batch, P thread processing units 115, a spilling memory 730 and the local memory 116. Work items that belong to the same workgroup may use the local memory 116 for sharing data. In one embodiment, the controller unit 750 manages the allocation and access of the local memory 116 for the different batches in the compute unit 110 and the different workgroups in a batch.

Work items that belong to the same workgroup may also use the spilling memory 730 for storing intermediate data or context, such as when they encounter a synchronization barrier and are temporarily suspended (e.g., by entering a wait state). The wait state ends when all work items in that workgroup reach the synchronization barrier. In one embodiment, when a given workgroup in a batch reaches a synchronization barrier, the work items in the given workgroup may be saved in the spilling memory 730 and the rest of the work items in the given workgroup will be processed. Assume that the number of thread processing units 115 assigned to the given workgroup is equal to K (where K=P/M), in one embodiment, the K thread processing units 115 may cycle through all of the rest of the work items in the given workgroup before the given workgroup can move past the synchronization barrier. In an alternative embodiment, all P thread processing units 115 in the batch can be devoted to processing all the rest of the work items in the given workgroup in order to quickly bring the entire given workgroup to the synchronization barrier. The work items in the batch that are suspended due to the synchronization barrier may be temporarily saved in the spilling memory 730.

Figure 8A:
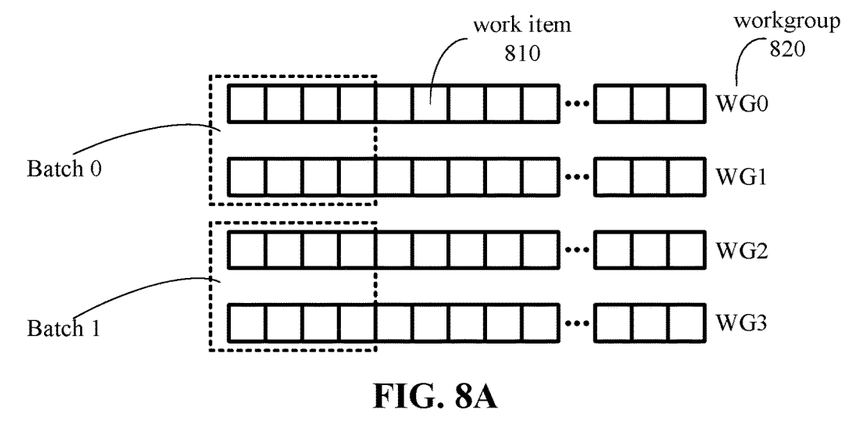
FIG. 8A and FIG. 8B illustrate examples of workgroup assignments into batches according to one embodiment.
Figure 8B:
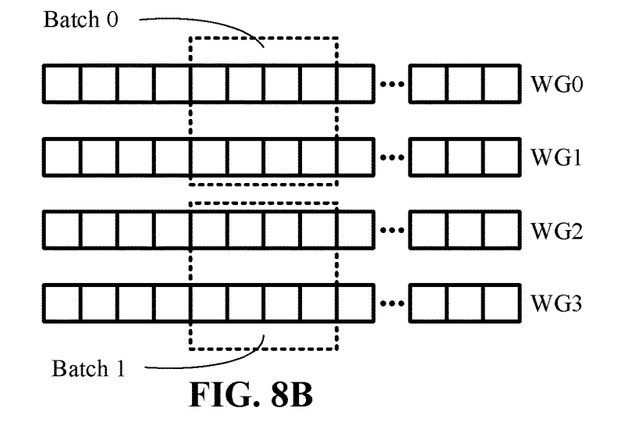

FIG. 8A and FIG. 8B illustrate examples of workgroup assignments into batches according to one embodiment. In these examples, four workgroups 820 (WG0, WG1, WG2, WG3) are assigned to two batches (Batch 0 and Batch 1). Each batch includes two workgroups 820, and has the capacity to process four work items in parallel. FIG. 8A shows the first four work items being processed in parallel, and FIG. 8B illustrates the next four work items being processed in parallel. In some embodiments, work items in different workgroups may be unsynchronized; therefore, in some embodiments, different workgroups may progress at different paces. However, the workgroups in the same batch progress at the same pace due to the sharing of a program counter.

Figure 9:
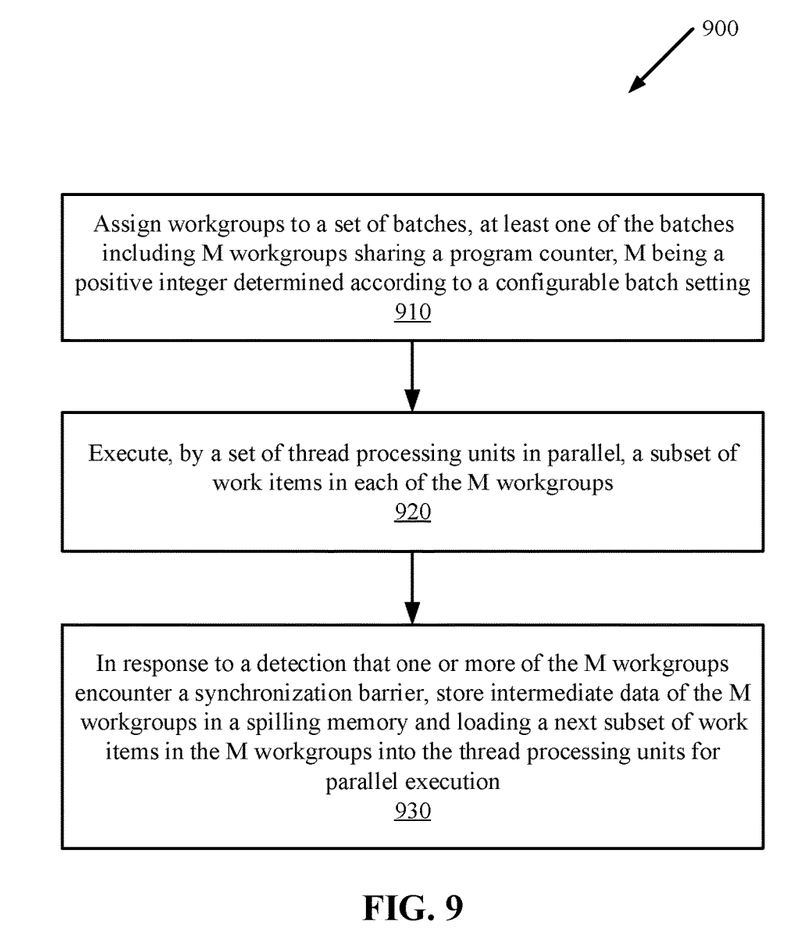
FIG. 9 is a flow diagram illustrating a method performed by a computing device with configurable workgroup assignments for parallel computations according to one embodiment.

FIG. 9 is a flowchart illustrating a method 900 performed by a computing device with configurable workgroup assignments for parallel computations according to one embodiment. In one embodiment, the method 900 may be performed by a parallel computing system or device, such as the computing device 700 of FIG. 7.

The method 900 begins with the controller unit 750 assigning workgroups to a set of batches (step 910). At least one of the batches ("the given batch") is assigned M workgroups sharing a program counter, M being a positive integer determined according to a configurable batch setting. The given batch includes a set of thread processing units. The set of thread processing units execute, in parallel, a subset of work items in each of the M workgroups (step 920). In response to a detection that one or more of the M workgroups encounter a synchronization barrier, intermediate data of the M workgroups is stored in a spilling memory, and a next subset of work items in the M workgroups are loaded into the thread processing units for parallel execution (step 930).

A parallel computing system has been described. The parallel computing system may overcome the limitations of conventional hardware platforms to achieve efficient data access and reuse, as well as flexible assignments of workgroups. Therefore, the overall energy and computing efficiency of the system can be improved.

The operations of the flow diagrams of FIGS. 6 and 9 have been described with reference to the exemplary embodiments of FIGS. 1, 3, 4 and 7. However, it should be understood that the operations of the flow diagrams of FIGS. 6 and 9 can be performed by embodiments of the invention other than those discussed with reference to FIGS. 1, 3, 4 and 7, and the embodiments discussed with reference to FIGS. 1, 3, 4 and 7 can perform operations different than those discussed with reference to the flow diagrams. While the flow diagrams of FIGS. 6 and 9 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A computing device operative to perform parallel computations, comprising:
   a plurality of thread processing units; and
   a memory shuffle engine coupled to the thread processing units, the memory shuffle engine including:
      an array of registers operative to store an array of data elements retrieved from a memory buffer; and an array of input selectors, each input selector coupled to a corresponding subset of the registers via input lines and one or more corresponding thread processing units via one or more output lines, wherein the memory shuffle engine is operative to transfer:

in response to a first control signal applied to the input selectors, a first sequence of the data elements in a first subset of the registers to the thread processing units in parallel with each thread processing unit receiving respective one data element, and in response to a second control signal applied to the input selectors, a second sequence of the data elements in a second subset of the registers to the thread processing units in parallel with each thread processing unit receiving respective one data element, wherein the second sequence is a shifted version of the first sequence.

2. The computing device of claim 1, wherein each input selector includes a multiplexer that is connected to the corresponding subset of the registers via multiple input lines, and is connected to one thread processing unit via one output line.

3. The computing device of claim 1, wherein each input selector is further coupled to, and receive one or more of the data elements from, at least an adjacent input selector via one or more inter-selector connections.

4. The computing device of claim 1, wherein each input selector, in response to a propagation control signal, is further operative to pass a data element from a first adjacent input selector to a second adjacent input selector.

5. The computing device of claim 1, wherein each input selector is operative to select different data elements from different registers, and transfer the different data elements to different thread processing units.

6. The computing device of claim 1, wherein each input selector is operative to select a data element from one of the registers, and transfer the data element to different thread processing units.

7. The computing device of claim 1, further comprising:
a memory shuffle controller operative to control the array of input selectors with one or more control signals, to perform at least one of operations including shift, shuffle, select and pass-through on the array of data elements.

8. A method of a computing device for performing parallel computations with a plurality of thread processing units, comprising:

receiving an instruction that identifies an array of data elements as input;

loading the array of data elements from a memory buffer into an array of registers in response to the instruction, wherein the array of registers is coupled to an array of input selectors, and each input selector is coupled to a corresponding subset of the registers via input lines;

transferring, in response to a first control signal applied to the input selectors, a first sequence of the data elements in a first subset of the registers to the thread processing units in parallel with each thread processing unit receiving respective one data element; and transferring, in response to a second control signal applied to the input selectors, a second sequence of the data elements in a second subset of the registers to the thread processing units in parallel with each thread processing unit receiving respective one data element, wherein the second sequence is a shifted version of the first sequence.

9. The method of claim 8, wherein each input selector includes a multiplexer that is connected to the corresponding subset of the registers via multiple input lines, and is connected to one thread processing unit via one output line.

10. The method of claim 8, further comprising:
receiving, by each input selector, one or more of the data elements from at least an adjacent input selector via one or more inter-selector connections.

11. The method of claim 8, further comprising:
in response to a propagation control signal, passing a data element by each input selector from a first adjacent input selector to a second adjacent input selector.

12. The method of claim 8, further comprising:
selecting, by each input selector, different data elements from different registers; and
transferring the different data elements to different thread processing units.

13. The method of claim 8, further comprising:
selecting, by each input selector, a data element from one of the registers; and
transferring the data element to different thread processing units.

14. The method of claim 8, further comprising:
controlling the array of input selectors with one or more control signals, to cause the input selectors to perform at least one of operations including shift, shuffle, select and pass-through on the array of data elements.

* * * * *